United States Patent [19]
Webster et al.

[11] 3,782,275
[45] Jan. 1, 1974

[54] LIGHT WEIGHT PLUNGER FOR A HAY BALER

[75] Inventors: Neil W. Webster, Pottstown; Donald L. Sheesley, New Holland, both of Pa.

[73] Assignee: Sperry Rand Corporation, New Holland, Pa.

[22] Filed: May 15, 1972

[21] Appl. No.: 253,403

[52] U.S. Cl. .............................. 100/98 R, 100/179
[51] Int. Cl. .............................................. B30b 9/00
[58] Field of Search ................... 100/98 R, 142, 179

[56] References Cited
UNITED STATES PATENTS

| | | | |
|---|---|---|---|
| 3,249,040 | 5/1966 | Van Der Lely | 100/98 R |
| 2,428,672 | 10/1947 | McClellan et al. | 100/179 |
| 2,923,230 | 2/1960 | Bornzin | 100/179 X |
| 2,850,965 | 9/1958 | Soteropulos | 100/179 |
| 3,115,823 | 12/1963 | Nolt et al. | 100/142 |

*Primary Examiner*—Billy J. Wilhite
*Attorney*—Frank A. Seemar, James J. Kennedy, John R. Flanagan and Joseph A. Brown

[57] ABSTRACT

The present invention relates to a light weight plunger of the type reciprocably mounted in a bale case of a hay baler and driven fore-and-aft therein to compact crop material being received within said bale case into rectangular bales. In particularly, the present plunger construction comprises a tubular subframe assembly mounted behind a head construction, the tubular subframe assembly being particularly adapted to receive one end of a connecting rod that is driven fore-and-aft within the bale case by a crank type drive provided with the baler. The tubular subframe structure comprises a pair of vertically spaced transversely extending tubular members secured to the backside of said head construction and joined at one end with a pair of vertically spaced fore-and-aft extending tubular members, the fore-and-aft tubular members being disposed on the same side of the plunger as a knife structure that acts to cut crop material being fed into the bale case as the plunger moves by the crop inlet area on the compression stroke. Also, the pair of fore-and-aft extending tubular members form an integral part of a single guide rail assembly that projects rearwardly from the plunger head construction and particularly includes roller means confined within a track structure such that during the reciprocable movement of the plunger with the bale case, the guide rail assembly provides a stabilizing influence on the entire plunger construction.

9 Claims, 6 Drawing Figures

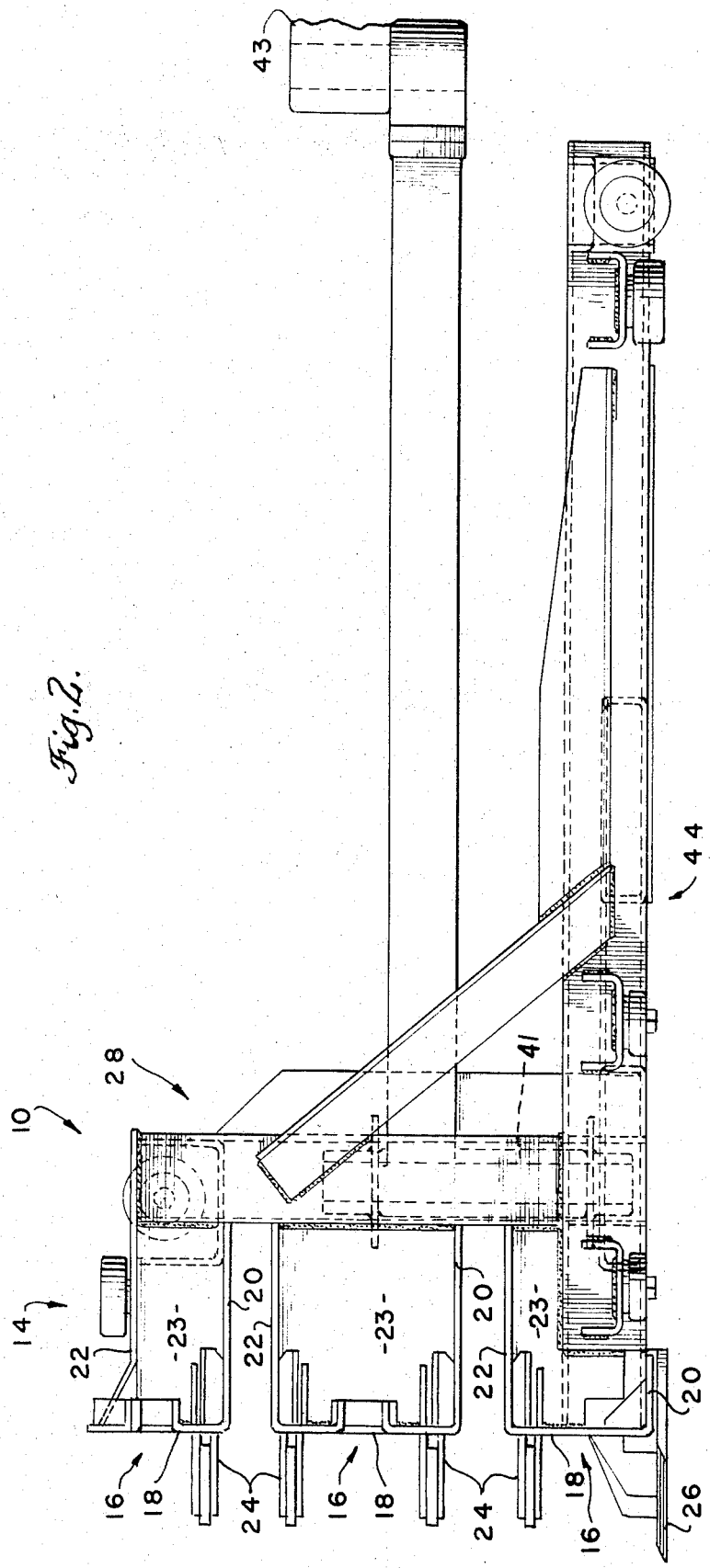

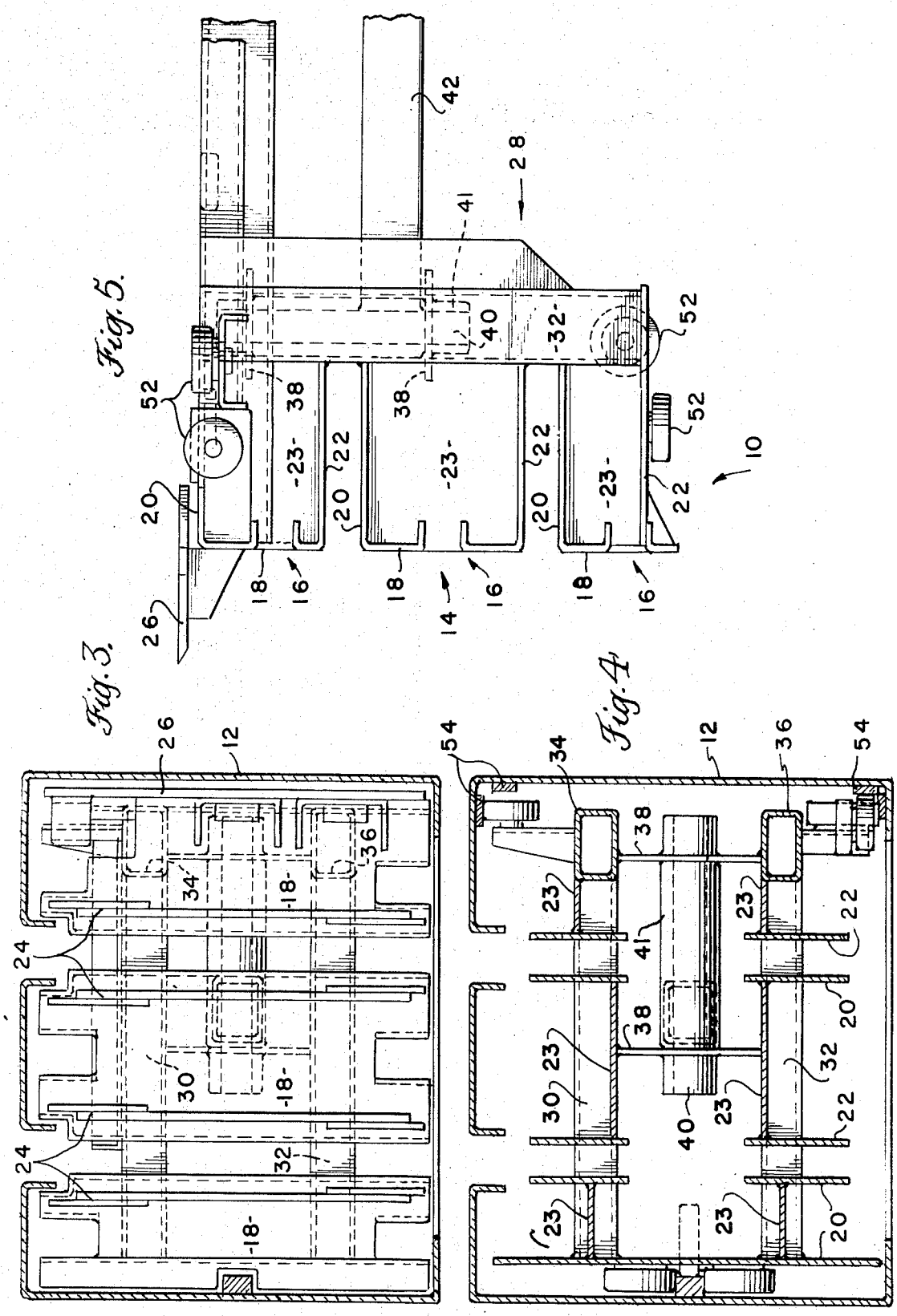

LIGHT WEIGHT PLUNGER FOR A HAY BALER

BACKGROUND OF THE INVENTION

The present invention relates to agricultural machinery, and more particularly to a plunger construction of the type utilized within the bale case of a hay baler.

Over the past years, considerable progress has been made in designing more efficient and higher capacity hay balers. In doing so, one particular concern has been to increase the strokes per minute of the plunger, thereby tending to increase the volume of crop material baled over a given time period. It is well recognized that in any hay baler that employs a reciprocable plunger that the baler is going to have a certain degree of back and forth surging associated therewith during the baling operation due to the back and forth movement of the plunger. This problem of baler surging, however, is considerably compounded as one attempts to increase the speed of the plunger, some situations giving rise to an intolerable degree of baler surging. The degree of surging is generally proportional to the total mass of the plunger being employed by the baler. Therefore, to reduce the total surging of the baler without slowing the plunger speed down, one might undertake to reduce the total mass of the plunger. But this is quite difficult to accomplish and still maintain enough strength within the plunger construction to protect against failure and fracture of the various elements comprising the plunger construction.

Therefore, it is the principle object of the present invention to provide a relatively light weight plunger particularly constructed to provide necessary strength at selected locations within the plunger construction to prohibit and avoid fracture and failure within the plunger due to various fore-and-aft forces encountered by the plunger during the baling operation.

In particular, it is the object of the present invention to provide a plunger construction having a generally tubular subframe assembly disposed behind a head construction, the head construction being that portion of the plunger that directly engages the crop material in the bale case for compaction; and to particularly provide a mounting structure within said tubular subframe assembly for receiving one end of a connecting rod for driving said plunger whereby said head structure does not have to directly absorb the loads encountered by the connecting rod.

A further object of the present invention resides in the provision of a subframe assembly aimed directly at absorbing the substantial loads encountered by a knife structure mounted on one side of the head construction adjacent the crop inlet of the baler.

More particularly, it is the object of the present invention to provide at least one fore-and-aft tubular member generally adjacent said knife structure for absorbing the loads encountered thereby.

A further object of the present invention resides in the provision of a guide rail assembly integrally formed with said one fore-and-aft tubular member for guiding and maintaining alignment of the plunger during the baling operation.

A further object of the present invention resides in the provision of a generally tubular subframe structure for supporting the head construction of a plunger, and wherein the generally tubular shaped subframe structure comprises a pair of vertically spaced transversely extending tubular members secured behind said head construction and further includes a pair of vertically spaced fore-and-aft extending tubular members fixed to said transverse tubular members and extending therefrom into said head construction where the fore-and-aft tubular members are secured therein.

Also, it is a further object of the present invention to provide a guide rail assembly that is integrally formed with a portion of a generally tubular shaped subframe assembly, thereby providing a relatively high strength construction as well as a practical and economical plunger design.

Other objects and advantages of the present invention will become apparent and obvious from a study of the following description and the accompanying drawings which are merely illustrative of the present invention.

BRIEF DESCRIPTION OF THE DRAWINGS

FIG. 2 is a plan view of FIG. 1 with the bale case omitted;

FIG. 3 is an end view of FIG. 1 looking toward the right in FIG. 1;

FIG. 4 is a cross section taken approximately on the line 4—4 in FIG. 1;

FIG. 5 is a fragmentary bottom view of FIG. 1 taken as indicated by the arrows 5—5 in FIG. 1.

DESCRIPTION OF THE PREFERRED EMBODIMENT

Figure 1:
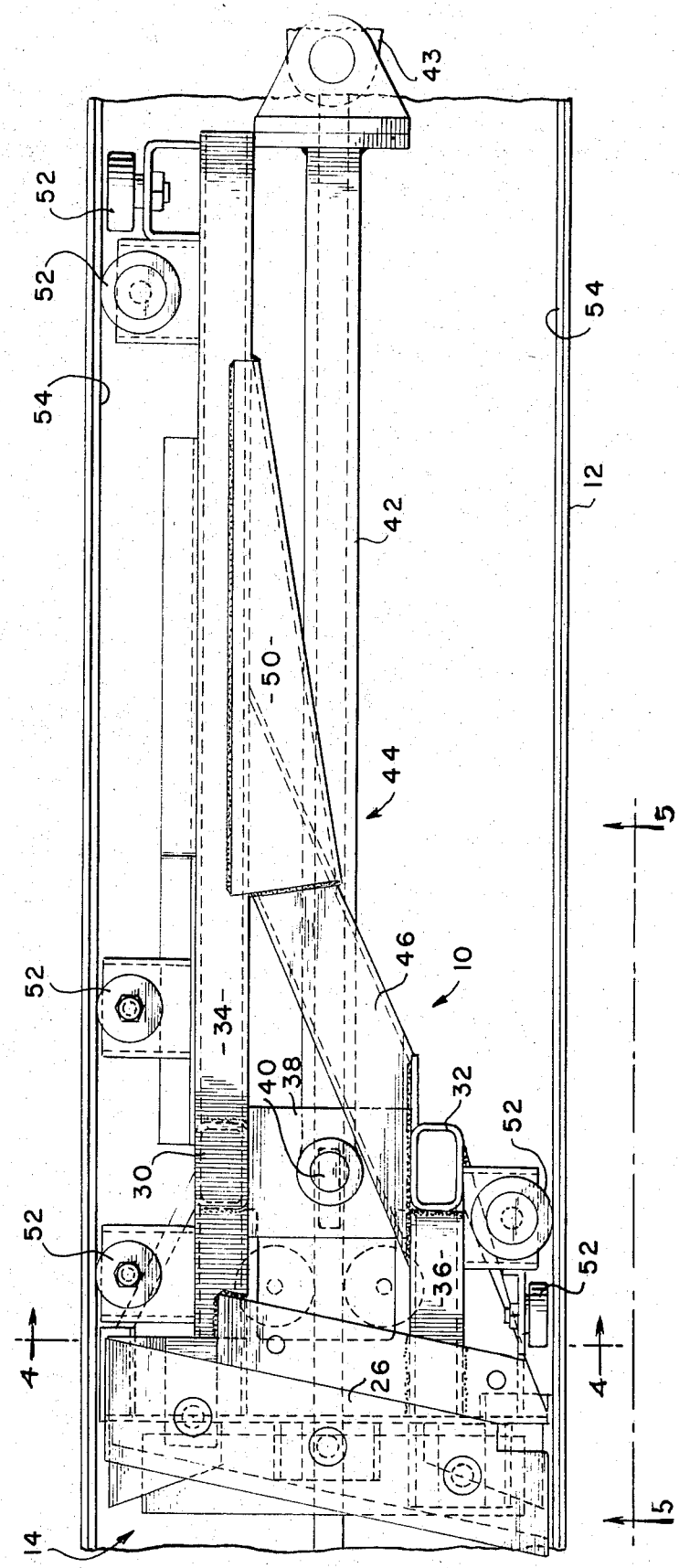
FIG. 1 is a side elevational view of a baler plunger constructed in accordance with the invention with a portion of the bale case of a baler and the connecting rod of the plunger illustrated.
Figure 6:
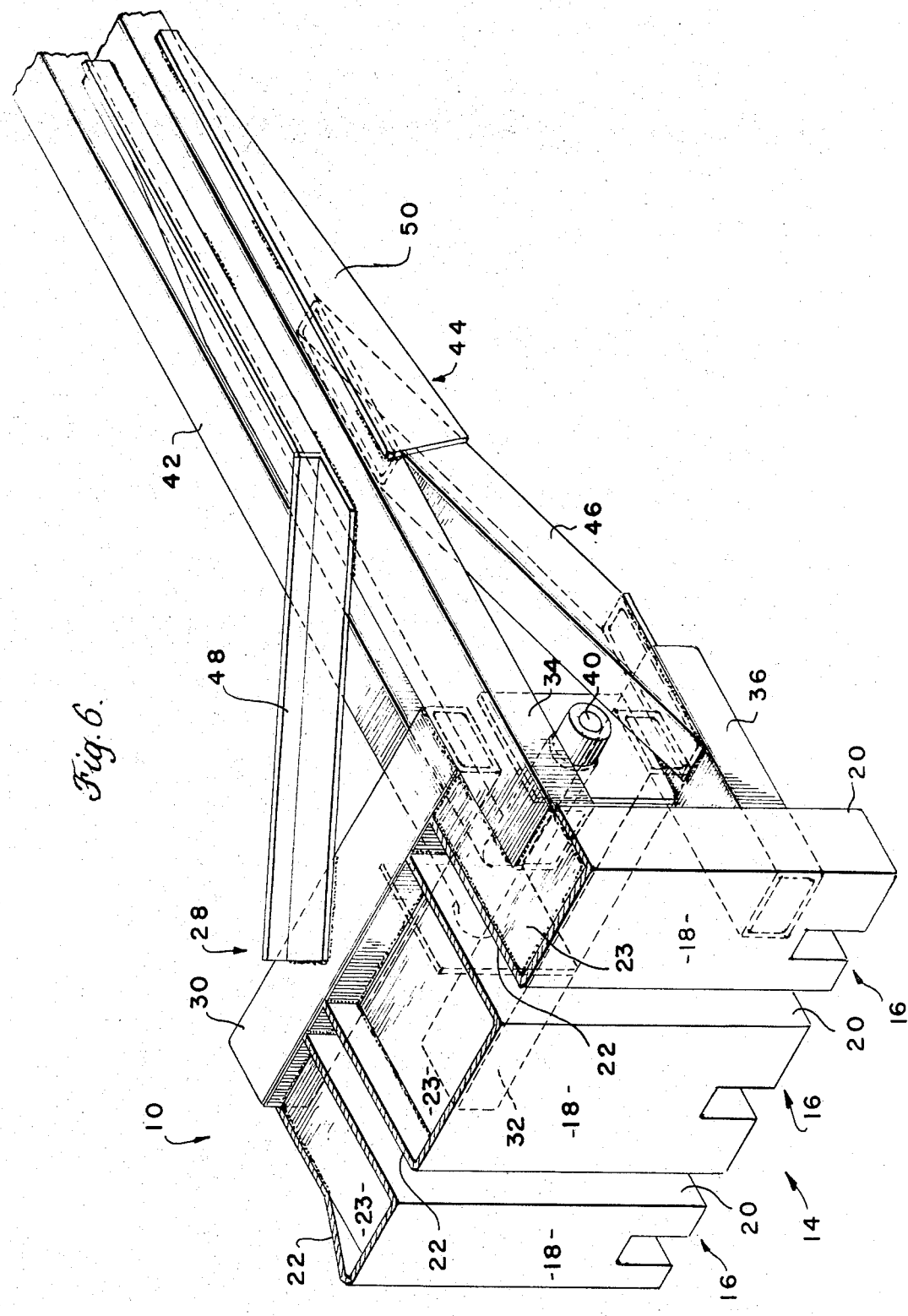
FIG. 6 is an isometric view illustrating the light weight structural framework of the plunger.

With reference to the drawings, particularly FIGS. 1, 2 and 6, a plunger, indicated generally by the numeral 10, is shown therein and reciprocably mounted within a generally longitudinal extending bale case 12, the bale case 12 being generally rectangular in cross section and being of the conventional type employed within hay balers. Turning to a detailed description of the plunger 10, it will be noted that the plunger basically comprises a plunger head construction 14, which for purposes of reference in the present specification and claims forms a front portion of the plunger. (It will be appreciated by those skilled in the art that the plunger is normally disposed in the baler bale case such that the head construction faces rearwardly of the baler relative to the direction of travel.) The head construction 14 includes a plurality of laterally spaced apart channel shaped head units 16, the space between each head unit being provided for the needles to extend therebetween during the tying operation. Due to the channel shape of each head unit 14, it will be noted that each unit includes a front face portion 18 and a pair of laterally spaced generally upright sides 20,22 that extend rearwardly from the front face (FIG. 6). Also, each head unit includes a pair of vertically spaced generally horizontally disposed reinforcing plates 23. As best seen in FIG., 2, the head construction 14 of the plunger is further provided with a series of forwardly projecting head extensions 24 that cooperate with the plunger head construction to compact the crop material being received into the bale case 12.

As with most conventional plungers, the present plunger 10 includes a vertically disposed knife 26 mounted adjacent the outer side of an outer head unit 16, the particular head unit being that unit that moves adjacent the crop inlet (not shown) of the hay baler such that during the compaction stroke the knife acts to sever crop material such that a smooth clean cut bale is formed.

Secured by weldment, or other suitable means, to the backside of said head construction 14 is a generally tubular subframe structure indicated generally by the numeral 28. The subframe structure 28 comprises a pair of vertically spaced transversely extending tubular members 30,32, with the tubular members being welded directly to the sides 20,22 of each head unit 16, as particularly shown in FIGS. 4 and 6. The reinforcing plates 23 are likewise welded or secured by other suitable means directly to a respective transverse tubular member.

Continuing to refer to the tubular subframe structure 28, a pair of vertically spaced fore-and-aft extending tubular members 34,36 are secured to the ends of the transverse tubular members 30,32 respectively, the fore-and-aft tubular members being particularly disposed on the side of the plunger corresponding to the side where the knife 26 is mounted. The presence of the fore-and-aft tubular members 34,36 give substantial rigidity to the head unit 16 having the knife 26 mounted thereto and also serve to absorb those shearing loads encountered by the knife 26.

Integrally formed with the fore-and-aft tubular members 34,36 is a rearwardly projecting guide rail assembly 44. As particularly viewed in FIGS. 1 and 6 the upper fore-and-aft tubular member 34 extends continuously rearwardly and has a pair of rollers secured about its rearmost end that ride along the track structure 54 formed in the bale case 12. Continuing to refer to the guide rail assembly 44, it will be observed that an upwardly inclined brace 46, also preferably of tubular construction, extends between the lower fore-and-aft tubular member 36 and the upper fore-and-aft tubular member 34. The guide rail assembly is given additional strength by a side brace 50 and a diagonal brace 48, the diagonal brace 48 as shown in FIG. 6 extends between the upper surface of the upper transverse tubular member 30 and the upper surface of the upper fore-and-aft tubular member 34.

Turning particularly to FIG. 4, it is observed that the tubular subframe structure further comprises a pair of laterally spaced generally upright plates 38, the plates 38 being provided with a cross shaft 40 which pivotally connects one end of a fore-and-aft extending connecting rod 42 with the plunger 10, the connecting rod being driven by a conventional crank drive, indicated by the numeral 43 in FIGS. 1 and 2. Specifically, the connecting rod 42 includes a hub 41 that is journalled about the cross shaft 40.

Also the plunger 40 of the present invention is provided with numerous rollers throughout, all of the rollers being indicated by the numeral 52 and particularly adapted to ride along various track structures formed along the bale case 12, all of the track structures being referred to by the numeral 54.

Thus, it is seen that the present plunger provides a relatively light weight construction but particularly disposes the various structural elements in stragetic locations to yield an optimum overall strong construction.

With respect to the type of material utilized, it should be pointed out that the tubular construction of the subframe assembly is basically comprised of high strength rectangular tubular steel, as is the construction of the guide rail assembly 44. The head construction on the other hand may be constructed of numerous types of material but the material shown in the present disclosure for the head construction is preferably a medium to heavy range of sheet metal. Therefore, it is seen that the plunger of the present invention gives the overall strength that is required while generally reducing the total weight of the plunger and thereby yielding a plunger that may be driven at relatively high speeds but yet does not compound the surging problems that were found in plungers of the prior art.

The terms, "upper," "lower," "forward," "rearward" etc. have been used herein merely for the convenience of the foregoing specification and in the appended claims to describe the light weight plunger for a hay baler and its parts as oriented in the drawings. It is to be understood, however, that these terms are in no way limiting to the invention since the light weight plunger for a hay baler may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A baler plunger of the type reciprocally mounted for fore-and-aft movement in a bale case of a baler, comprising:
   a head construction including a plurality of laterally spaced heads;
   a knife structure mounted to one side of said head construction;
   two vertically spaced apart upper and lower tubular members extending substantially across the width of the bale case, each one of the two tubular members being directly secured to a portion of each of said laterally spaced heads;
   a pair of laterally spaced plates offset to the same side as the knife structure and mounted between said upper and lower tubular members;
   a cross connecting pin secured between said plates; and
   a connecting rod having one end secured to said cross connecting pin between said plates and the other end driven by said baler.

2. A baler plunger, as recited in claim 1, wherein each of said laterally spaced heads is of channel-shaped construction including a face portion spaced away from said tubular members and further includes a pair of vertically spaced, horizontally disposed reinforcing plates, each reinforcing plate extending between the face portion of a particular head and a respective transverse tubular member.

3. A baler plunger, as recited in claim 1, wherein said plunger further comprises a pair of vertically spaced fore-and-aft extending tubular members, each of said fore-and-aft tubular members being fixed to one end of a respective transverse tubular member on the same side as the knife structure and said laterally spaced plates, one end of each of said fore-and-aft tubular members extending into said head construction.

4. A baler plunger, as recited in claim 3, wherein said fore-and-aft tubular member form a portion of a guide arm assembly that projects away from said head construction, said guide arm assembly including roller means mounted about one end of one of said fore-and-aft tubular members which extends away from the head construction, said roller means being confined with tracks formed in the bale case.

5. A baler plunger of the type reciprocally mounted within a bale case of a baler and having a head construction including a plurality of laterally spaced head units for compacting crop material within said bale case, a knife structure mounted to one side of said head construction and particularly adapted to cut through portions of the crop material being fed into the bale case as a plunger compacts crop material, and a driven connecting rod operative to reciprocate said plunger head construction within said bale case, the improvement comprising:

a tubular subframe assembly disposed adjacent to said head construction and including a pair of vertically spaced transversely extending tubular members secured to said head construction;

a pair of laterally spaced plates secured between said transverse tubular members and offset to the same side as the knife structure;

a cross connecting pin secured between said plates, one end of said connecting rod being journalled about said pin between said plates; and a fore-and-aft tubular assembly including at least one fore-and-aft tubular member, a side portion of said one fore-and-aft tubular member being fixed to one end of a respective transverse tubular member on the same side as the knife structure, one end of said fore-and-aft tubular member extending into said head construction and being secured thereto.

6. A baler plunger, as recited in claim 5, wherein each of said heads is of channel shaped construction including a face portion spaced away from said tubular subframe assembly and further including a pair of vertically spaced horizontally disposed reinforcing plates, each reinforcing plate extending between a face portion of the channel member and a respective transverse tubular member, whereby the forces encountered by the face portion of the channel shaped members while compacting crop material is transferred to the tubular transverse members of the subframe assembly by said reinforcing plates.

7. A baler plunger, as recited in claim 5, wherein said fore-and-aft tubular assembly includes a second fore-and-aft tubular member, a side portion of said second fore-and-aft tubular member being fixed to one end of the upper vertically spaced transversely extending tubular member on the same side as the knife structure, one end of said second fore-and-aft tubular member extending into said head construction and being secured thereto, the other end of said second tubular member projecting away from said head construction and carrying roller means mounted about the end away from said head construction, said roller means being confined within tracks formed in the bale case, said fore-and-aft tubular assembly also including an inclined tubular brace which extends from the end remote from said head construction of said one fore-and-aft tubular member to an intermediate portion of said second fore-and-aft extending tubular member.

8. A baler plunger of the type mounted within a bale case of a baler and connected to a connecting rod for reciprocal movement, said plunger comprising:

a head construction including a plurality of laterally spaced head units for engaging and compacting crop material received in said bale case; a knife mounted on one side of said head construction for severing crop material being delivered into said bale case on said plunger's compression stroke;

a generally tubular subframe structure mounted behind said head construction and including a pair of vertically spaced transversely extending tubular members disposed in parallel relationship and fixed to one side of said head construction, each transversely extending tubular member extending substantially across the width of the bale case, a pair of laterally spaced plates secured between said pair of transverse tubular members, and a transverse cross connecting pin secured between said plates for receiving one end of said connecting rod, said laterally spaced plates being offset to the same side as said knife; and a guide rail assembly offset to the same side of the plunger as said knife structure so as to be more closely aligned with the fore-and-aft forces encountered by said knife, said guide rail assembly including first and second fore-and-aft tubular members, said fore-and-aft tubular member being fixed to said transverse tubular assembly and extending therefrom into said head construction, and said second fore-and-aft tubular member being fixed to said transverse tubular assembly and extending therefrom into said head construction in general parallel relationship with respect to said first fore-and-aft tubular member, said second tubular member extending away from said head construction and having roller means mounted thereon, said roller means being confined within a track structure formed within said bale case.

9. A baler plunger, as recited in claim 8, wherein each of said head units comprises a channel shaped member having a face portion spaced away from said transversely extending tubular members and a pair of laterally spaced sides extending between said face portion and said transversely extending tubular members with each of said sides being fixed to said transversely extending tubular members, and wherein a pair of vertically spaced horizontally disposed reinforcing plates extend between said face portion and said transversely extending tubular members.

* * * * *